(12) United States Patent
Rafferty et al.

(10) Patent No.: US 10,699,176 B1
(45) Date of Patent: Jun. 30, 2020

(54) PAYMENT CARD WITH BATTERY CHARGER ASSEMBLY

(71) Applicant: Capital One Services, LLC, McLean, VA (US)

(72) Inventors: Galen Rafferty, Mahomet, IL (US); Vincent Pham, Champaign, IL (US); Reza Farivar, Champaign, IL (US); Anh Truong, Champaign, IL (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/688,410

(22) Filed: Nov. 19, 2019

(51) Int. Cl.
*G06K 19/07* (2006.01)
(52) U.S. Cl.
CPC ..... *G06K 19/0715* (2013.01); *G06K 19/0704* (2013.01)

(58) Field of Classification Search
None
See application file for complete search history.

(56) References Cited

U.S. PATENT DOCUMENTS

| | | | |
|---|---|---|---|
| 9,324,071 B2 | 4/2016 | Faith et al. | |
| 9,680,518 B2 | 6/2017 | Wojcik et al. | |
| 2003/0098355 A1 | 5/2003 | Johnson | |
| 2009/0108079 A1* | 4/2009 | Reynolds | G06Q 20/3433 235/494 |
| 2011/0084149 A1 | 4/2011 | Faith et al. | |

* cited by examiner

*Primary Examiner* — Kristy A Haupt
(74) *Attorney, Agent, or Firm* — Banner & Witcoff, Ltd.

(57) ABSTRACT

Aspects described herein may allow for a payment card assembly includes a payment card and a battery positioned in the payment card. A power generating device is positioned in the payment card, has a driven gear, and is electrically connected to the battery. A rotatable drive gear mounted to the payment card engages the driven gear of the power generating device.

20 Claims, 2 Drawing Sheets

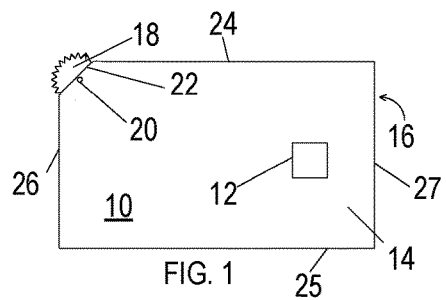
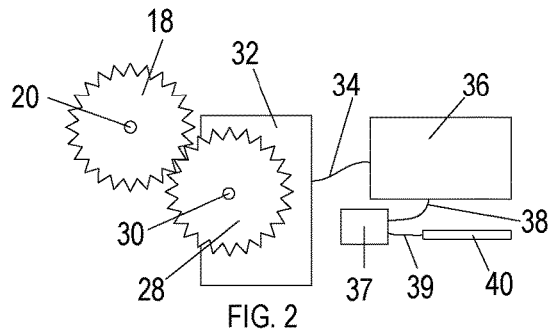
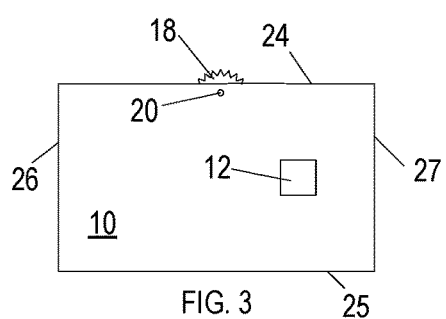
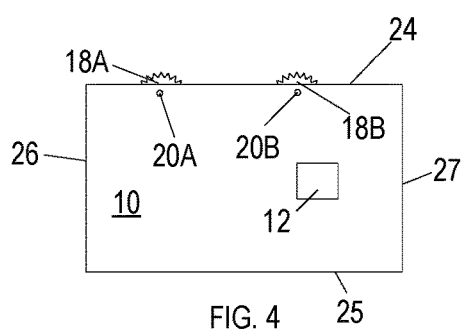
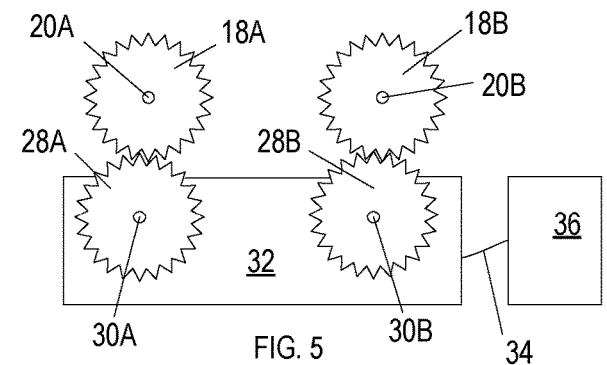
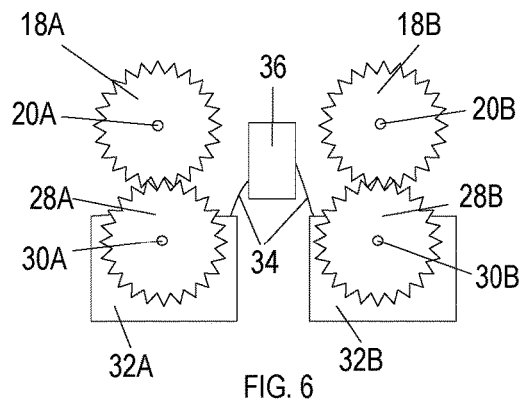
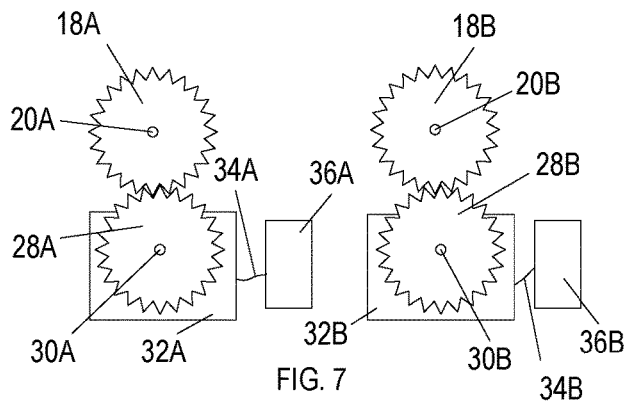
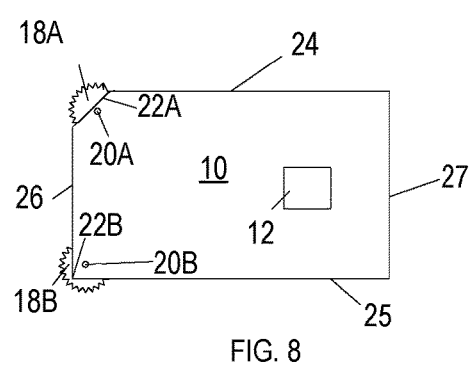

PAYMENT CARD WITH BATTERY CHARGER ASSEMBLY

FIELD OF USE

Aspects of the disclosure relate generally to a payment card with a battery that can be charged. More specifically, aspects of the disclosure may provide for a payment card having a battery and a rotatable drive gear that can engage a power generating device that is electrically connected to the battery.

BACKGROUND

Payment cards are becoming increasingly more expensive as card issuers are making payment cards of expensive materials, such as metal, and including electronic components within the payment cards thereby creating so-called smart cards. Powered components in payment cards require the use of a battery. Replacing the payment card when the battery runs low can be inconvenient for the user, and such replacement is becoming more expensive as the cost of the payment cards grows.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a system that allows a user to charge a battery that is positioned within a payment card, such as a credit card, that includes powered components, such as a microchip. Such a microchip could be a Europay Mastercard Visa ("EMV") chip, for example. The payment card may have advanced powered functions, and having a rechargeable battery allows the user to avoid the complexity and cost of replacing the payment card when the battery runs low.

In accordance with certain embodiments, a payment card assembly includes a payment card and a battery positioned in the payment card. A power generating device is positioned in the payment card, has a driven gear, and is electrically connected to the battery. A rotatable drive gear mounted to the payment card engages the driven gear of the power generating device.

In accordance with other aspects, a payment card assembly may include a payment card, a battery positioned in the payment card, and a microchip electrically connected to the battery. An antenna may be electrically connected to the microchip. A first dynamo may be positioned in the payment card, and have a first driven gear, and be electrically connected to the battery. A second dynamo may be positioned in the payment card, have a second driven gear, and be electrically connected to the battery. A first drive gear may be mounted to the payment card on a first shaft at a first corner of the payment card and engage the first driven gear. A second drive gear may be mounted to the payment card on a second shaft at a second corner of the payment card and engage the second driven gear. The first and second corners of the payment card may be adjacent corners of the payment card.

In accordance with further aspects, a payment card assembly may include a payment card, a battery positioned within the payment card, a microchip electrically connected to the battery, and an antenna electrically connected to the microchip. A plurality of first dynamos may be positioned within the payment card, with each first dynamo having a first driven gear and being electrically connected to the battery. A plurality of second dynamos may be positioned within the payment card, with each second dynamo having a second driven gear and being electrically connected to the battery. Each of a plurality of first drive gears may be mounted to the payment card on a first shaft along a first peripheral edge of the payment card and rotatably engage one of the first driven gears. Each of a plurality of second driven gears may be mounted to the payment card on a second shaft along a second peripheral edge of the payment card opposite the first peripheral edge and rotatably engage one of the second rotatable driven gears.

By using a payment card with a rotatable drive gear that engages a driven gear of a power generating device to charge a battery, individuals can avoid having to replace the entire payment card when the battery runs low. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 1 depicts a plan view of an example of a payment card with a rotatable drive gear that may be used in implementing one or more aspects of the disclosure in accordance with one or more illustrative aspects discussed herein;

FIG. 2 depicts a schematic view of components of the payment card of FIG. 1;

FIG. 3 depicts a plan view of an alternative embodiment of the payment card of FIG. 1;

FIG. 4 depicts a plan view of another alternative embodiment of the payment card of FIG. 1;

FIG. 5 depicts a schematic view of components of an alternative embodiment of the payment card of FIG. 1;

FIG. 6 depicts a schematic view of components of another alternative embodiment of the payment card of FIG. 1;

FIG. 7 depicts a schematic view of components of yet another alternative embodiment of the payment card of FIG. 1;

FIG. 8 depicts a plan view of another alternative embodiment of the payment card of FIG. 1;

DETAILED DESCRIPTION

Figure 9:
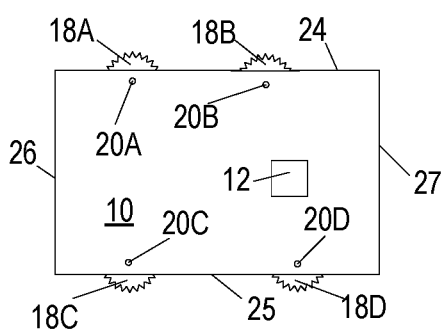
FIG. 9 depicts a plan view of a further alternative embodiment of the payment card of FIG. 1.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Embodiments discussed herein depict a payment card having a rechargeable battery. Exemplary payment cards can include credit cards, debit cards, ATM cards, and money access cards ("MAC"). The payment card may include a microchip, such as an EMV chip, and/or a magnetic strip. Making the battery rechargeable allows a user to take advantage of powered components of the payment card, without replacing the entire payment card when the battery runs low. This is especially advantageous since the electronics positioned within the card, such as microchips and an antenna, may be expensive, and the payment card itself may be made of an expensive material, such as metal.

An embodiment of a payment card 10 is illustrated in FIG. 1. Payment card 10 may include an EMV chip 12 on a first surface 14 thereof, and may include a magnetic strip (not visible) on an opposed second surface 16. A rotatable drive gear 18 may be rotatably mounted to payment card 10 on a shaft 20. In the illustrated embodiment, drive gear 18 is mounted at a first corner 22 of payment card 10 such that a portion of drive gear 18 is exposed along a first peripheral edge 24 of payment card 10, and a portion of drive gear 18 is exposed along a second peripheral edge 26 of payment card 10 that is generally perpendicular and adjacent first peripheral edge 24. It is to be appreciated that drive gear 18 may be mounted at any corner of payment card 10. Thus, drive gear 18 could also be exposed along a third peripheral edge 25 of payment card 10, opposite first peripheral edge 24, and/or a fourth peripheral edge 27 of payment card 10, opposite second peripheral edge 26.

In the illustrated embodiment, a portion of first corner 22 is cut away from payment card 10. It is to be appreciated that in other embodiments first corner 22 may not have a portion cut away from payment card 10.

As seen in FIG. 2, which illustrates components contained within payment card 10, drive gear 18 may rotatably engage and drive a rotatable driven gear 28 that may be rotatably mounted on a shaft 30 of a power generating device 32. In certain embodiments, power generating device 32 may be a dynamo, which uses that rotation of driven gear 28 to generate a magnetic field and produce current. In other embodiments, power generating device 32 may be a generator, which also produces current. Power generating device 32 may be connected by a wire or cable 34, or other conducting element, to a rechargeable battery 36 to which the current produced in power generating device 32 is transmitted.

A powered element such as a microchip 37 may be electrically connected by a wire or cable 38 to battery 36. Microchip 37 may be embedded within payment card 10 between first surface 14 and second surface 16. In certain embodiments, microchip 37 could be EMV chip 12, which may be partially exposed to an exterior of payment card 10 on first surface 14. An antenna 40 may be electrically connected by a wire or cable 39 to microchip 37. Antenna 40 may be embedded within payment card 10 between first surface 14 and second surface 16. It is to be appreciated that other powered components of payment card 10 may also be electrically connected to battery 36 and embedded within payment card 10.

When drive gear 18 rotates, it forces driven gear 28 to rotate as well, thereby producing an electrical current in power generating device 32, which is then transmitted to battery 36, thereby charging battery 36. In order to get drive gear 18 to rotate and consequently produce current in power generating device 32, a user may spin drive gear 18 with their fingers to cause it to rotate. Drive gear 18 may also be rotated when payment card 10 is inserted into or removed from the slot of the user's wallet or purse where they store payment card 10. As payment card 10 is inserted into and/or removed from the slot of the wallet or purse, drive gear 18 may ride along the material of the wallet or purse, thereby causing it to rotate and consequently produce current in power generating device 32. In other embodiments, drive gear 18 may be rotated as it is inserted into and/or removed from a card reader on a point of sale system ("POS"), ATM, or other device with a card reader.

Another embodiment is illustrated in FIG. 3, in which drive gear 18 is positioned along first peripheral edge 24, which is the longer peripheral edge of payment card 10 in the illustrated embodiment. It is to be appreciated that drive gear 18 could alternatively be positioned along second peripheral edge 26, which is the shorter peripheral edge of payment card 10 in the illustrated embodiment.

In other embodiments payment card 10 may include an additional drive gear 18 mounted to payment card 10. In the embodiment illustrated in FIG. 4, a pair of drive gears 18A, 18B may be positioned along first peripheral edge 24. It is to be appreciated that drive gears 18A, 18B could alternatively be positioned along second peripheral edge 26, third peripheral edge 25, or fourth peripheral edge 27. In other embodiments, more than one additional drive gear 18 may be mounted to payment card. For example, two, or three, or more additional drive gears 18 may be mounted to payment card 10.

In certain embodiments, as illustrated in FIG. 5, each of drive gears 18A, 18B positioned along first peripheral edge 24 may be operably connected to a single power generating device 32. As shown here, drive gear 18A may be rotatably supported on a shaft 20A, and rotatingly engage a driven gear 28A that is mounted on a shaft 30A of power generating device 32. Similarly, drive gear 18B may be rotatably supported on a shaft 20B, and rotatingly engage a driven gear 28B that is mounted on a shaft 30B of power generating device 32. Power generating device 32 may be electrically connected by way of a wire or cable 34 to battery 36. Powered components of payment card 10 can then be electrically connected to battery 36.

In other embodiments, as illustrated in FIG. 6, each of drive gears 18A, 18B positioned along first peripheral edge 24 may be operably connected to a separate generating device 32A, 32B. As shown here, drive gear 18A may be rotatably supported on a shaft 20A, and rotatingly engage a driven gear 28A that is mounted on a shaft 30A of a first power generating device 32A. Similarly, drive gear 18B may be rotatably supported on a shaft 20B, and rotatingly engage a driven gear 28B that is mounted on a shaft 30B of a second power generating device 32B. Each of power generating device 32A, 32B may be electrically connected by way of a wire or cable 34 to battery 36. Powered components of payment card 10 can then be electrically connected to battery 36.

In a further embodiment, as illustrated in FIG. 7, each of drive gears 18A, 18B positioned along first peripheral edge 24 may be operably connected to a separate generating device 32A, 32B. As shown here, drive gear 18A may be rotatably supported on a shaft 20A, and rotatingly engage a driven gear 28A that is mounted on a shaft 30A of a first power generating device 32A. Similarly, drive gear 18B may be rotatably supported on a shaft 20B, and rotatingly engage a driven gear 28B that is mounted on a shaft 30B of a second power generating device 32B. First power generating device 32A and second power generating device 32B may each be electrically connected by way of a wire or cable 34 to a separate battery 36A, 36B. Thus, first power generating device 32A may be electrically connected to a first battery 36A by a first cable 34A, while second power generating device 32B may be electrically connected to a second battery 36B by a second cable 34B. Powered components of payment card 10 can then be electrically connected to battery 36A and battery 36B.

In another embodiment, as illustrated in FIG. 8, a first drive gear 18A may be rotatably mounted on a shaft 20A at a first corner 22A of payment card 10, and a second drive gear 18B may be rotatably mounted on a shaft 20B at a second corner 22B of payment card 10. In the illustrated embodiment, first corner 22A and second corner 22B are adjacent corners of payment card 10. It is to be appreciated that in other embodiments first corner 22A and second corner 22B need not be adjacent corners. It is to be appreciated that in other embodiments, drive gears 18 may be positioned on three, or all four corners 22 of payment card 10. In the illustrated embodiment, a portion of first corner 22A is cut away from payment card 10, exposing more of first drive gear 18A, while second corner 22B is complete and has no portion cut away from payment card 10. It is to be appreciated that payment card 10 can include any combination of complete or partially cutaway corners 22.

In another embodiment, as illustrated in FIG. 9, a pair of first drive gears 18A, 18B may be positioned along first peripheral edge 24 of payment card 10, and a pair of second drive gears, 18C, 18D may be positioned along a third peripheral edge 42 of payment card 10 opposite first peripheral edge 24. First drive gears 18A, 18B and second drive gears 18C, 18D may be operably connected to corresponding driven gears 28 of one or more power generating devices 32.

Figure 10:
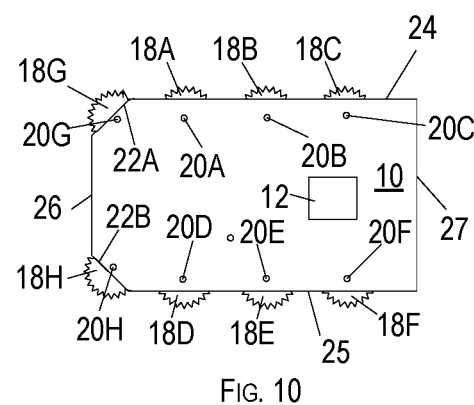
FIG. 10 depicts a plan view of yet another alternative embodiment of the payment card of FIG. 1.

In other embodiments, more than two drive gears 18 may be positioned along either or both of first peripheral edge 24 and third peripheral edge 25. Further, in certain embodiments drive gears 18 may be positioned along both of first peripheral edge 24 and third peripheral edge 25, as well as at one or more corners 22. For example, as illustrated in FIG. 10, three first drive gears 18A, 18B, 18C may be mounted to payment card 10 with corresponding first shafts 20A, 20B, 20C along first peripheral edge 24, and three second drive gears 18D, 18E, 18F may be mounted to payment card with 10 corresponding second shafts 20D, 20E, 20F along third peripheral edge 25 opposite first peripheral edge 24. Further, a pair of third drive gears 18G, 18H may be mounted to payment card 10 with corresponding third shafts 20G, 20H at first corner 22A and second corner 22B, respectively. First drive gears 18A, 18B, 18C; second drive gears 18C, 18D, 18E; and third drive gears 18G, 18H may be operably connected to corresponding driven gears 28 of one or more power generating devices 32.

Further, it is to be appreciated that more than three drive gears 18 can be positioned along any of first peripheral edge 24, second peripheral edge 26, third peripheral edge 25, and fourth peripheral edge 27. Additionally, it is to be appreciated that payment card 10 is not restricted to having the same number of drive gears 18 on any opposed peripheral edges 24-27. Thus, an odd number of drive gears 18 (e.g., one or three) could be positioned along first peripheral edge 24 while an even number of drive gears 18 (e.g., two or four) could be positioned along third peripheral edge 25 opposite first peripheral edge 24. Additionally, any number of third drive gears 18 could be positioned at corresponding corners 22 of payment card 10.

Further, it is to be appreciated that other various drive gear-driven gear combinations may be utilized for the payment card 10. For example, one drive gear 18 may be operably connected to one driven gear 28, one drive gear 18 may be operably connected to multiple driven gears 28, multiple drive gears 18 may be operably connected to one driven gear 28, or multiple drive gears 18 may be operably connected to multiple driven gears 28. In another example, one or more drive gears 18 may be operably connected to another set of one or more drive gears which are then in turn operably connected to one or more driven gears 28.

By providing rotatable drive gear 18 rotatably mounted to payment card 10 on a shaft 20, and having drive gear 18 engage driven gear 28, which is rotatably mounted to power generating device 32, which in turn generates current to charge rechargeable battery 36, a user can advantageously use powered components such as microchip 37 without the need to replace battery 36 when its power level runs low.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A payment card assembly comprising: a payment card; a battery positioned in the payment card; a power generating device positioned in the payment card, having a driven gear, and electrically connected to the battery; and a rotatable drive gear mounted to the payment card such that a portion of the rotatable gear is exposed outwardly of a peripheral edge of the payment card, and engaging the driven gear of the power generating device.

2. The payment card assembly of claim 1, wherein the power generating device is a dynamo.

3. The payment card assembly of claim 1, wherein the power generating device is a generator.

4. The payment card assembly of claim 1, wherein the drive gear is positioned at a corner of the payment card.

5. The payment card assembly of claim 1, wherein the drive gear is positioned along a peripheral edge of the payment card.

6. The payment card assembly of claim 1, further comprising a microchip electrically connected to the battery, and an antenna electrically connected to the microchip.

7. The payment card assembly of claim 1, further comprising an additional drive gear mounted to the payment card.

8. The payment card assembly of claim 7, wherein the additional drive gear is operably connected to the power generating device.

9. The payment card assembly of claim 7, wherein the additional drive gear is operably connected to an additional power generating device.

10. The payment card assembly of claim 9, wherein the additional power generating device is electrically connected to the battery.

11. The payment card assembly of claim 9, wherein the additional power generating device is electrically connected to an additional battery positioned in the payment card.

12. The payment card assembly of claim 7, wherein the drive gear is positioned at a first corner of the payment card and the additional drive gear is positioned at a second corner of the payment card.

13. The payment card assembly of claim 12, wherein the first and second corners are adjacent corners of the payment card.

14. The payment card assembly of claim 1, further comprising a plurality of additional drive gears mounted to the payment card.

15. The payment card assembly of claim 14, wherein the additional drive gears are mounted along a peripheral edge of the payment card.

16. The payment card assembly of claim 14, wherein a first set of the additional drive gears is positioned along a first peripheral edge of the payment card and a second set of the additional drive gears is positioned along a second peripheral edge of the payment card opposite the first peripheral edge.

17. The payment card assembly of claim 14, wherein the additional drive gears are operably connected to the power generating device.

18. The payment card assembly of claim 14, wherein each of the additional drive gears is operably connected to an additional power generating device.

19. A payment card assembly comprising: a payment card; a battery positioned in the payment card; a microchip electrically connected to the battery; an antenna electrically connected to the microchip; a first dynamo positioned in the payment card, having a first driven gear, and electrically connected to the battery; and a second dynamo positioned in the payment card, having a second driven gear, and electrically connected to the battery; and a first drive gear mounted to the payment card on a first shaft at a first corner of the payment card such that a portion of the first drive gear is exposed outwardly of a peripheral edge of the payment card, and engaging the first driven gear; and a second drive gear mounted to the payment card on a second shaft at a second corner of the payment card such that a portion of the second drive gear is exposed outwardly of the peripheral edge of the payment card, and engaging the second driven gear, wherein the first and second corners of the payment card are adjacent corners of the payment card.

20. A payment card assembly comprising: a payment card; a battery positioned within the payment card; a microchip electrically connected to the battery; an antenna electrically connected to the microchip; a plurality of first dynamos positioned within the payment card, each first dynamo having a first driven gear and being electrically connected to the battery; a plurality of second dynamos positioned within the payment card, each second dynamo having a second driven gear and being electrically connected to the battery; and a plurality of first drive gears, each first drive gear mounted to the payment card on a first shaft along a first peripheral edge of the payment card such that a portion of each first drive gear is exposed outwardly of the first peripheral edge of the payment card, and rotatably engaging one of the first driven gears; and a plurality of second drive gears, each second drive gear mounted to the payment card on a second shaft along a second peripheral edge of the payment card opposite the first peripheral edge such that a portion of each second drive gear is exposed outwardly of the second peripheral edge of the payment card, and rotatably engaging one of the second driven gears.

* * * * *